United States Patent

Kincaid et al.

[11] Patent Number: 5,597,258
[45] Date of Patent: Jan. 28, 1997

[54] PRELOADED PIVOT JOINT

[75] Inventors: Jeffrey Kincaid, Clarkson; Manoj Bhandiwad, Utica; Kenneth G. Kraft, Warren, all of Mich.

[73] Assignee: American Axle & Manufacturing Inc., Detroit, Mich.

[21] Appl. No.: 595,658

[22] Filed: Feb. 2, 1996

[51] Int. Cl.⁶ .................................................. F16C 11/06
[52] U.S. Cl. ........................ 403/144; 403/138; 403/132; 403/120
[58] Field of Search .................................. 403/144, 147, 403/146, 145, 138, 132, 120

[56] References Cited

U.S. PATENT DOCUMENTS

| | | | |
|---|---|---|---|
| 1,868,818 | 7/1932 | Eksergian | 464/90 |
| 2,009,401 | 7/1935 | Hufferd et al. | 403/138 |
| 2,471,672 | 5/1949 | Booth | 403/132 |
| 2,569,823 | 10/1951 | Moskovitz | 403/132 |
| 2,855,232 | 10/1958 | Kozak | 403/132 |
| 3,053,556 | 3/1960 | Klocke et al. | 403/138 |
| 3,135,540 | 6/1964 | Herbenar | 403/132 X |
| 3,290,073 | 12/1966 | Gottschald | 403/132 X |
| 3,945,737 | 3/1976 | Herbenar | 403/27 |
| 4,102,585 | 7/1978 | Herbenar | 403/361 |
| 4,415,291 | 11/1983 | Smith | 403/36 |
| 4,629,352 | 12/1986 | Nemoto | 403/132 X |
| 5,022,779 | 6/1991 | Schnitzler | 403/138 |

FOREIGN PATENT DOCUMENTS 2441917  3/1976  Germany ........................ 403/144

Primary Examiner—Anthony Knight
Attorney, Agent, or Firm—Reising, Ethington, Barnard & Perry

[57] ABSTRACT

A pitman arm incorporates a preloaded pivot joint that has a stud that rotates and angulates. The preloaded pivot joint is designed so that different internal components transfer the respective lateral loads, axial compression loads and angulation loads of the stud.

3 Claims, 1 Drawing Sheet

PRELOADED PIVOT JOINT

BACKGROUND OF THE INVENTION

This invention relates generally to pivot joints and more particularly to preloaded pivot joints that are used in automotive steering linkages.

U.S. Pat, No. 2,009,401 issued to George H. Hufferd and Matthew P. Graham Jul. 30, 1935 discloses a typical preloaded pivot joint for a steering linkage system comprising a housing, a stud and a spring loaded bearing seat inside the housing. The stud rotates and angulates with respect to the housing. The angulation capability is provided by two concentric part spherical members on the inner end portion of the stud that engage a fixed bearing seat in the housing and the spring loaded bearing seat respectively. In this design, the lateral loads of the stud are transferred to the housing by the fixed bearing seat while the axial compression loads are transferred by the spring loaded bearing seat and its associated spring. The pivot joint does not, have any internal mechanism for limiting angulation and so the stud angulates freely until the stud makes metal-to-metal contact with the housing.

U.S. Pat. No. 3,053,556 issued to David E. Klocke and Vincent J Ryszewski Sep. 11, 1962 discloses a preloaded pivot joint for the idler arm of an automotive steering linkage that has a stud that rotates but does not angulate. The Klocke joint comprises a housing, a stud, and a compression spring inside the housing. The Klocke stud has a part spherical portion that engages a fixed bearing seat in the housing under the bias of the compression spring. The Klocke stud has a cylindrical extension at the inner end that is disposed in a thin plastic sleeve housed in a hat-shaped well of the housing cover. The cylindrical extension, the thin plastic bushing and the hat shape of the cover well combine to prevent the stud from angulating any substantial degree so that the stud is limited essentially to rotation. In this design the lateral loads of the stud are taken by the fixed bearing seat, the axial compression loads are taken by the compression spring and the angulation loads are taken by the thin plastic sleeve. However, as indicated above, the thin plastic sleeve virtually eliminates stud angulation.

U.S. Pat. No. 3,945,737 issued to Edward J. Herbenar Mar. 23, 1976 also discloses a preloaded pivot joint for an automotive steering linkage. The Herbenar pivot joint likewise comprises a housing, a stud and a compression spring inside the housing. The stud has a part spherical portion that engages a fixed bearing seat in the housing under the bias of the compression spring. In this instance the compression spring is in the form of a relatively thick bushing of flowable resilient material such as rubber, polyurethane and the like. The resilient bushing is axially split and has a tapered bore. The stud has a tapered extension at the inner end that is disposed in the tapered bore of the resilient bushing so that the resilient bushing performs two functions. The resilient bushing biases the part spherical portion of the stud into engagement with the fixed bearing seat and the resilient bushing also accommodates limited angulation of the stud. In this design the compressive loads of the stud and the angulation loads of the stud are taken by the same member, i.e. the axially split, resilient bushing with the tapered bore. Thus the design inhibits freedom in selecting an axial preload independently of angulation considerations and vice-versa. Moreover the design incorporates a biasing spring that tightens the axially split bushing around the tapered extension of the stud which then resists rotation of the stud.

SUMMARY OF THE INVENTION

The object of this invention is to provide a preloaded pivot joint which accommodates a substantial but limited angulation of the stud and which has separate internal components for taking up the lateral loads, the compressive loads and the angulation loads of the stud.

A feature of the invention is that the preloaded pivot joint has a resilient bushing and a stud that has a cylindrical extension that cooperates with the resistant bushing for accommodating angulation of the stud.

Another feature of the invention is that the preloaded pivot joint has a stud that has a cylindrical extension that engages a cylindrical bore of a resilient bushing for accommodating angulation and a spherical tip at the end of the cylindrical extension that engages a moveable bearing seat in the housing for isolating axial compression loads of the stud from the bushing.

Still another feature of the invention is that the preloaded pivot joint has a stud that has a cylindrical extension at one end that reacts with a resilient bushing to resist angulation loads of the stud and with a second spring to transfer compression loads of the stud.

Still another feature of the invention is that the preloaded pivot joint has a stud that has a cylindrical extension that movably engages a hardened metal ring of a resilient composite bushing for accommodating angulation of the stud and reducing rotational resistance to stud rotation.

Still another feature of the invention is that the preloaded pivot joint has a stud that has a part spherical collar for transferring lateral loads to a fixed bearing seat, a concentric part spherical tip for transferring compressive loads to a spring biased bearing seat, and a cylindrical extension between the part spherical collar and the part spherical tip for transferring angulation loads to a hardened cylindrical metal ring of a resilient composite bushing.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
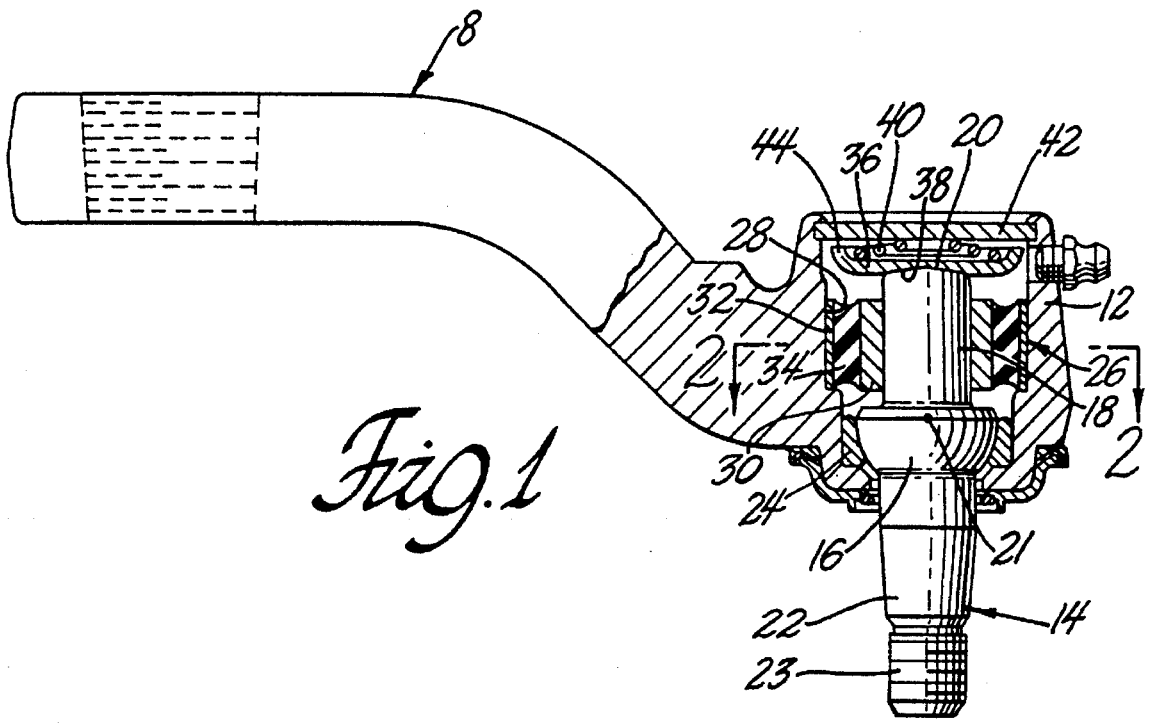
FIG. 1 is a partially sectioned elevation view of a preloaded pivot joint in accordance with the invention.

Referring now to the drawing, FIG. 1 illustrates a pitman arm 8 equipped with a preloaded pivot joint 10 of the invention for connecting the pitman arm 8 to another link of a steering linkage (not shown). The pivot joint 10 comprises a housing 12 that is an integral part of the pitman arm 8 and a stud 14 that rotates and angulates with respect to the housing 12.

The stud 14 has a part spherical collar 16 midway between its ends. The collar 16 and one end portion of the stud 14 is retained in the housing 12. This inner end portion of the stud 14 comprises an elongated cylindrical extension 18 of reduced diameter at the larger end of the part spherical collar 16. There is a spherical tip 20 at the inner end of the cylindrical extension 18 that merges smoothly into the cylindrical extension 18 by means of a curved surface. The part spherical collar 16 and the part spherical tip 20 are substantially concentric about a center 21 with the radius of the part spherical tip 20 being about the same as the diameter of the part spherical collar 16.

The opposite end portion of the stud 14 protrudes through an enlarged opening of the housing 12. This outer end portion comprises a tapered shank 22 and a threaded tip 23 for attaching the stud 14 to an adjacent link of a steering linkage (not shown).

The preloaded pivot joint 10 includes a fixed bearing seat 24 in the housing 12 that is engaged by the part spherical collar 16 of the stud 14. The fixed bearing seat 22 may be an integral part of the housing 12. However it is preferably a separate bearing ring as shown in the drawing so that the bearing seat 24 can be hardened and ground to a more precise shape and finer surface finnish.

Figure 2:
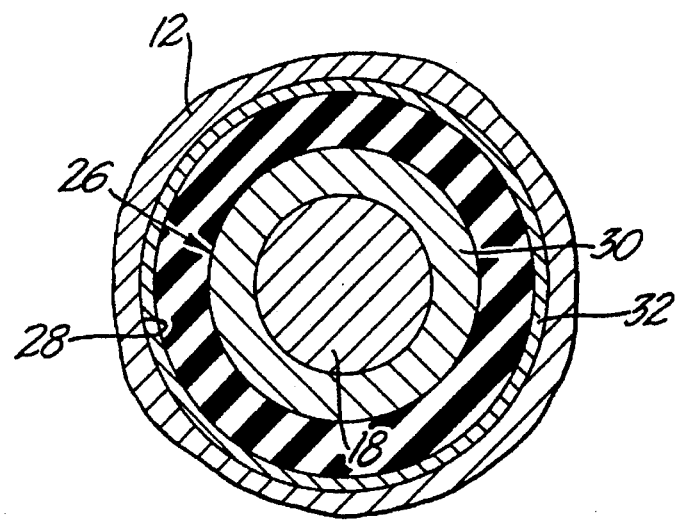
FIG. 2 is a section taken substantially along the line 2—2 of FIG. 1 looking in the direction of the arrows.

The preloaded pivot joint 10 further includes a resilient composite bushing 26 that is mounted in an enlarged bore 28 of the housing 12 above the fixed bearing seat 24. The resilient composite bushing 26 comprises a thick inner ring 30 of steel or other hardenable or bearing metal, an outer ring 32 of steel or other suitable metal and an intermediate annulus 34 of elastomeric material such as natural or synthetic rubber as best seen in FIG. 2.

The elastomeric annulus 34 is preferably bonded to and compressed by the inner and outer metal rings 30 and 32. The elastomeric annulus 34 is made of a material that preferably has a durometer in the range of 70–80 and that has good fatigue characteristics. The material must also be compatible with greases used in the pivot joint 10 and commonly used chassis lubricants.

The inner metal ring 30 is hardened and has a sliding fit on the cylindrical extension 18 so that resistance to rotation of the stud 14 in the resilient composite bushing 26 is minimal or at least reduced even when the stud 14 is angulated and rotated.

The outer metal ring 32 is press fit in the enlarged bore 28 against an internal shoulder of the housing 12 so that the composite bushing 26 is retained in the housing 12 in a position where it does not interfere with other internal components of the pivot joint 10. When so positioned, the composite bushing 26 holds the stud 14 in an upright position where the axis of the stud 14 is coincident with the axis of the housing 12. However, the elastomeric annulus 30 deforms responsive to angulation of the stud 14 by the link to which it is attached (not shown) so as to accommodate a substantial angulation of the stud 14 with respect to the housing 12. The material for the elastomeric annulus 30 is preferably chosen so that angulation of the stud 14 is stopped by the stiffness of the material before the outer end portion of the stud 14 engages the housing 12 in metal-to-metal contact or there is any other metal-to-metal contact in the pivot joint 10.

The preloaded pivot bearing 10 further includes a moveable bearing seat 36 that engages the spherical tip 20 of the stud 14. The bearing seat 36 preferably has a spherical surface 38 for mating engagement with the stud tip 20. The bearing seat 36 is generally flat so as to maintain a spacing from the composite bushing 26 in the axial direction and avoid interfering with the composite bushing 26 when the stud 14 angulates in the housing 12.

The preloaded pivot joint 10 further comprises a compression spring 40 and a cover 42 that is attached to the housing 12 in any suitable manner such as by swaging over the edge of the housing 12 as shown in FIG. 1. The compression spring 40 is located between the bearing seat 36 and the cover 42 so that the compression spring 40 biases the moveable bearing seat 36 against the stud tip 20 and the part spherical collar 16 of the stud 14 against the fixed bearing seat 24. This preloads the pivot joint 10. The concentric arrangement of the part spherical collar 16 and tip 20 avoids deterioration of the preload when the stud 14 is angulated.

The compression spring 40 is in the form of a conical coil spring that is preferably trapped by a curled outer rim 44 of the moveable bearing seat 36.

During operation, the stud 14 of the preloaded pivot joint 10 experiences lateral loads and axial compression loads and generates angulation loads when it is angulated in the housing 12. The lateral loads are transferred to the housing 12 by the fixed bearing seat 24. The axial compression loads are transferred to the moveable bearing seat 36, thence to the compression spring 40 and ultimately to the housing 12 via housing cover 42. The angulation loads are transferred to the housing 12 via the resilient composite bushing 26. Thus each of the three stud loads are taken up by different internal components of the pivot joint 10. Moreover, the composite bushing 26 isolates the angulation loads from the lateral loads and the axial compression loads while minimizing resistance to rotation of the stud in the composite bearing. Furthermore the composite bushing 26 accommodates substantial yet limited stud angulation so that there is not any metal-to-metal contact in the pivot joint 10, such as the outer end portion of the stud 14 engaging the housing 12 where it protrudes out of the housing. Thus this invention provides a preloaded pivot joint that has limited but substantial angulation capability and considerable design freedom because different internal components transfer the lateral loads, axial compression loads and angulation loads of the stud.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

The embodiments of the invention in which an exclusive property or privilege is claimed are defined as follows:

1. A preloaded pivot joint assembly comprising;

a housing having an axis, a stud having an inner end portion that is retained in the housing so that the stud rotates and angulates with respect to the housing, the inner end portion of the stud having a part spherical collar that engages a fixed bearing seat in the housing, a cylindrical extension and a part spherical tip that engages a moveable bearing seat in the housing, a compression spring biasing the moveable bearing seat against the tip of the stud, and a resilient bushing mounted in the housing and engaging the cylindrical extension of the stud for accommodating limited angulation of the stud with respect to the housing.

2. A preloaded pivot joint assembly comprising;

a housing having an opening, a stud having an outer end portion that protrudes through the opening in the housing and an inner end portion that is retained in the housing so that the stud rotates and angulates with respect to the housing, the inner end portion of the stud having a part spherical collar that engages a fixed bearing seat in the housing, a cylindrical extension at the larger end of the part spherical collar and a part spherical tip at the end of the cylindrical extension that engages a moveable bearing seat in the housing, a compression spring biasing the moveable bearing seat against the tip of the stud, and a resilient composite bushing mounted in the housing and slidably engaging the cylindrical extension of the stud for accommodating limited angulation of the stud with respect to the housing.

3. A preloaded pivot joint assembly comprising;

a housing having an opening, a stud having an outer end portion that protrudes through the opening in the housing and an inner end portion that is retained in the housing so that the stud rotates and angulates with respect to the housing, the inner end portion of the stud having a part spherical collar that engages a fixed bearing seat in the housing, a cylindrical extension at the larger end of the part spherical collar and a part spherical tip at the end of the cylindrical extension that is substantially concentric with the part spherical collar, a generally flat moveable bearing seat in the housing having a spherical surface engaging the part spherical surface of the tip, a compression spring biasing the moveable bearing seat against the tip of the stud, and a resilient composite bushing comprising an outer metal ring press fitted in an enlarged bore of the housing above the fixed bearing seat in a position spaced from the moveable bearing seat in the axial direction, the resilient composite bushing having an inner metal ring slidably engaging the cylindrical extension of the stud and an intermediate elastomeric annulus for accommodating limited angulation of the stud with respect to the housing.

* * * * *